United States Patent [19]

Bauer et al.

[11] 4,244,483

[45] Jan. 13, 1981

[54] ELECTRICAL WIRING BOX

[75] Inventors: Claude J. Bauer, Parkersburg, W. Va.; Roger D. Johnson, Asheville, N.C.

[73] Assignee: GTE Products Corporation, Stamford, Conn.

[21] Appl. No.: 66,754

[22] Filed: Aug. 15, 1979

[51] Int. Cl.³ .......................... H02G 3/08; H02G 3/12
[52] U.S. Cl. ...................................... 220/3.2; 220/229; 220/266
[58] Field of Search .................... 220/3.2, 3.5, 3.3, 3.8, 220/229, 266

[56] References Cited

U.S. PATENT DOCUMENTS

| | | |
|---|---|---|
| 1,850,165 | 3/1932 | Barnett ................................. 220/266 |
| 3,770,873 | 11/1973 | Brown .................................. 220/3.2 |
| 3,873,759 | 3/1975 | Schindler et al. ..................... 220/3.2 |
| 3,917,101 | 11/1975 | Ware ................................... 220/3.2 |
| 3,926,330 | 12/1975 | Deming et al. ....................... 220/266 |
| 3,965,287 | 6/1976 | Mueller ............................... 220/266 |
| 4,007,852 | 2/1977 | Gernhardt ............................ 220/3.2 |
| 4,053,084 | 10/1977 | Anderson ............................ 220/229 |
| 4,071,159 | 1/1978 | Robinson et al. ..................... 220/3.2 |
| 4,202,457 | 5/1980 | Tansi ................................... 220/3.3 |

*Primary Examiner*—George E. Lowrance
*Attorney, Agent, or Firm*—Jerry F. Janssen

[57] ABSTRACT

A molded plastic electrical wiring box having knock-out regions comprising a two-flap structure with the flaps having essentially planar offset surfaces providing a frangible bridge or web to separate the flaps.

7 Claims, 12 Drawing Figures

ELECTRICAL WIRING BOX

BACKGROUND OF THE INVENTION

This invention relates to electrical wiring boxes. More particularly, it is concerned with molded plastic electrical wiring boxes having a knock-out structure for accomodating non-metallic sheathed cables.

Typically, electrical wiring boxes include knock-out arrangements for permitting the passage of electrical wiring between the interior and the exterior of the box. Molded plastic boxes generally have knock-outs which are formed as an integral part of the box and which are held in place in the walls of the box by frangible connections so that they may be readily removed to provide apertures through the walls for the passage of electrical wiring to the interior of the box.

Various knock-out structures have been employed in molded plastic wiring boxes in order to provide solutions to various problems. One significant concern is the size of the opening remaining in the knock-out aperture after a cable has been inserted. Obviously, the tighter the cable fits within the aperture, the less opportunity there is for dirt and other undesirable materials to enter the box. Also, when the box is mounted in the wall space, there is a desire to minimize the flow of air through openings in the box into the room so as to minimize heat loss caused by drafts through the box. Certain known knock-out structures permit some additional closure of the remaining opening after a cable has been inserted in the knock-out aperture. However, most known types of knock-out structures do not adapt to a variety of cable sizes so as to minimize the remaining opening regardless of the cable size.

Application Ser. No. 909,424 filed May 25, 1978, in the names of William O. Arnold et al. and assigned to the assignee of the present application, discloses a molded plastic electrical outlet box having a two-flap integrally molded knock-out structure. The two-flap knock-out structure shown therein accomodates a variety of cable sizes while closing to minimize the opening which remains after insertion of the cable into the box. However, because of the detailed configuration of the knock-out structure, in some instances difficulties are encountered in achieving facile release of the molded box from the mold.

SUMMARY OF THE INVENTION

An electrical wiring box in accordance with the present invention includes an improved knock-out structure permitting a variety of cable sizes to be passed therethrough while minimizing the opening remaining after the cable has been inserted. The box includes a wall structure defining front-to-rear walls and a back wall therebetween, which in combination define a chamber within the box. The wall structure includes a region of molded plastic having a generally rectangular knock-out of two knock-out flaps separated by a frangible web or bridge for enabling an aperture to be formed in the region in order to permit the passage of the non-metallic sheathed cable into the box. The frangible bridge or web extends across the knock-out region from one of the lines of fracture defining the edge of the knock-out region to the other, dividing the knock-out region into two flaps. The flaps have essentially planar inner and outer surfaces, the plane of each major surface of each flap being offset or spaced from the plane of the corresponding surface of the other flap to provide a thin frangible bridge or web between the flaps. The knock-out flaps are of essentially the same thickness, and the region in which the end of each flap opposite to the frangible bridge joins the surrounding wall structure of the molded plastic box forms a resilient or flexible hinge connecting each of the flaps to the wall structure. An aperture for accomodating non-metallic sheathed cable is formed by breaking the frangible bridge and by separating one or both of the knock-out flaps from the surrounding region along the lines of fracture, and bending one or both of the knock-out flaps about the hinge. After the cable is inserted, the hinged flap or flaps close closely against the cable, minimizing the size of the remaining opening.

For a better understanding of the present invention, together with other and further objects, advantages and capabilities thereof, reference is made to the following specification and appended claims in connection with the above-described drawings.

DETAILED DESCRIPTION OF THE INVENTION

Figure 1:
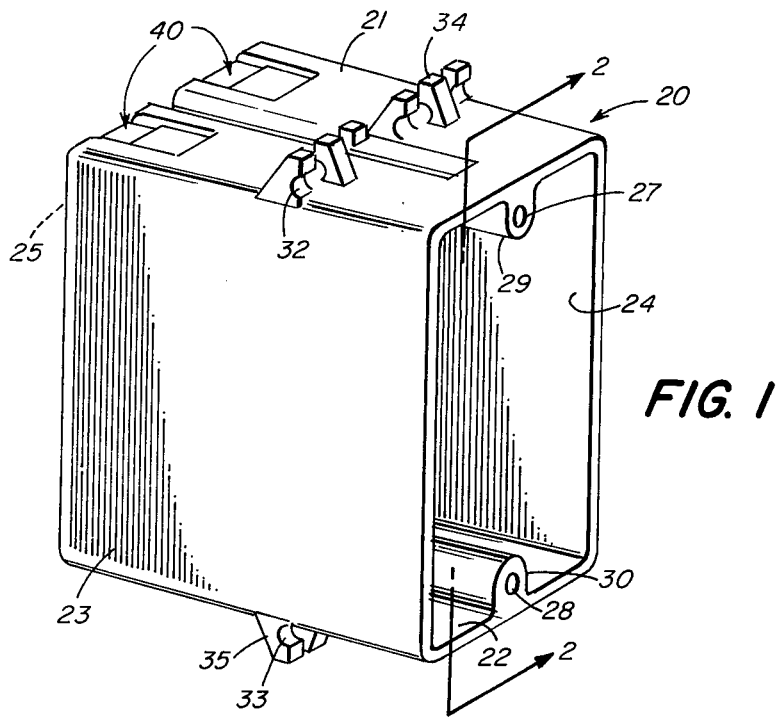
FIG. 1 is a perspective view of a molded plastic electrical wiring box in accordance with the present invention.
Figure 2:
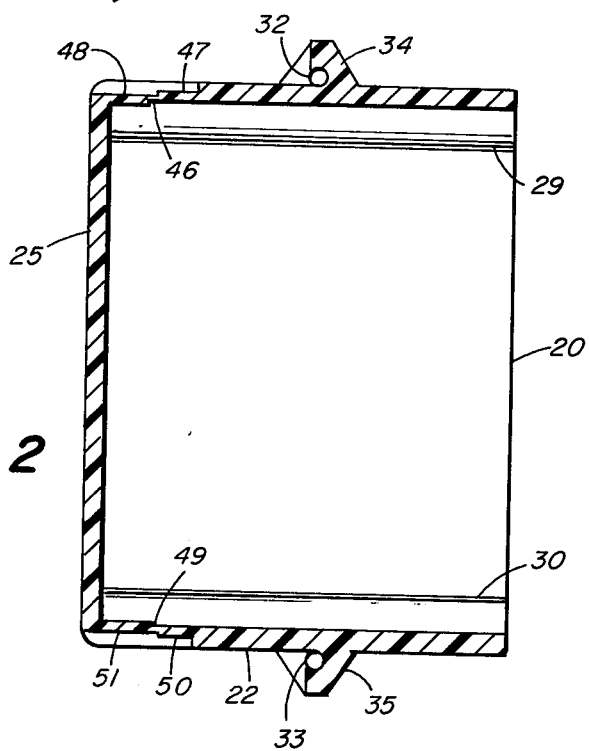
FIG. 2 is a cross-sectional view of the electrical wiring box of FIG. 1 taken generally along the line 2—2 in FIG. 1.

Referring to the drawings in detail, FIGS. 1 and 2 illustrate in perspective and in cross-section, respectively, a molded plastic electrical wiring box 20 in accordance with the present invention. The box includes integrally molded top wall 21, bottom wall 22, side walls 23 and 24, and back wall 25. The box may be fabricated of a synthetic organic thermoplastic, for example, polyvinylchloride, as by injection molding techniques. The walls define an opening at the front of the wiring box 20 and form a chamber for receiving an electrical device such as an electrical switch or receptacle as well as wires and other electrical connections associated with the electrical device. Screw receiving mounting elements 27 and 28 for supporting an electrical device in the box are positioned in bosses 29 and 30. The mounting elements desirably may be of the type disclosed and claimed in application Ser. No. 818,308 filed July 25, 1977, by Gary L. Mongeu entitled "Electrical Wiring Box" and assigned to the assignee of the present invention. Alternatively, the screw receiving elements 27 and 28 can be threads integrally molded into the screw receiving openings. The box may be mounted to a support, such as a stud, by common nails inserted through nail passageways 32 and 33 in an arrangement of nail lugs 34 and 35 integrally molded in the top and bottom walls 21 and 22, respectively.

Figure 8:
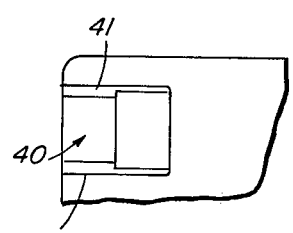
FIG. 8 is a fragmentary plan view of the electrical wiring box of FIG. 1 showing the knock-out region in detail.
Figure 9:
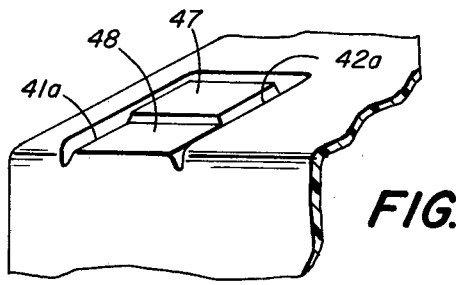
FIG. 9 is a fragmentary view in perspective of an alternative embodiment of the knock-out region of electrical wiring boxes of the present invention.

In accordance with the present invention the box includes a knock-out structure 40 located in each rearward portion of the top and bottom walls 21 and 22 adjacent to the back wall 25 at each corner. The knock-out structures 40 are integrally molded in the box during its fabrication. Each knock-out region is a thinned portion of its associated top or bottom wall. The knock-outs are generally rectangular in shape and have opposite side edges parallel to the side walls 23 and 24 as can be seen in FIG. 1. The opposite side edges of the knock-out region are delineated by lines of fracture 41 and 42 as shown in FIG. 8. The lines of fracture 41 and 42 may be very thin webs of molded plastic or may extend completely through the plastic or portions of the edges. Alternatively, as shown in FIG. 9, the lines of fracture 41a and 42a may be bevelled or tapered regions of the outer surfaces of the knock-out region, so formed that the molded plastic is thinner where the opposite side edges of the knock-out join the surrounding wall structure of the box.

As shown in cross-section in FIG. 2, each knock-out region is divided into two flaps 47 and 48, and 50 and 51 by a thin frangible web 46 and 49. As shown in FIG. 2, the flaps numbered 48 and 51 lie rearward, or adjacent to the back wall 25 of the box 20, while the flaps numbered 47 and 50 lie forward, or adjacent to the front opening of the box 20. As shown in greater detail in cross-section in FIG. 3, the flaps may be of equal size or, in an alternative embodiment shown in cross-section in FIG. 4, of unequal size. As shown in FIG. 4, the thin frangible web 46a divides the knockout region into a smaller rearward flap 48a and a larger forward flap 47a.

Figure 3:
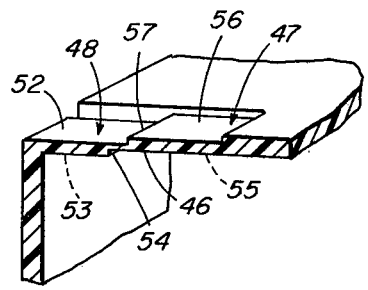
FIG. 3 is a fragmentary cross-sectional view in perspective showing in detail the knock-out region of the electrical wiring box of FIG. 1.
Figure 4:
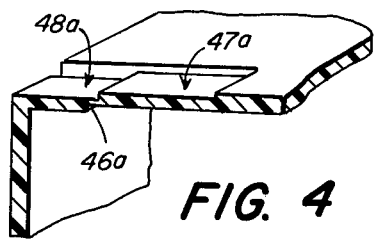
FIGS. 4–7 are fragmentary cross-sectional views in perspective of various alternative embodiments of the knock-out region of electrical wiring boxes of the present invention.

As can be seen by referring to FIG. 3, the rearward flap 48 has an essentially planar outer surface 52 and an essentially planar inner surface 53 with a leading edge 54. The forward flap 57 has an essentially planar inner surface 55 and an essentially planar outer surface 56 with a leading edge 57.

The plane of the major outer surface 56 of the forward flap 47 is offset or spaced apart in an outward direction from the plane of the major outer surface 52 of the rearward flap 48. Similarly, the plane of the major inner surface 55 of the forward flap 47 is offset or spaced apart in an outward direction from the plane of the major inner surface 53 of the rearward flap 48.

This construction of the knock-out region confers a number of advantages on molded plastic electrical wiring boxes according to the present invention. First, the offset of the inner and outer major surfaces of the knock-out region and their essential planarity greatly facilitates the release from the mold of finished boxes fabricated by injection molded techniques. There is no need for cammed or moving parts in the portion of the injection mold used to produce the knock-out region merely to facilitate mold release. This results in a savings of time and cost of manufacture for electrical wiring boxes according to the present invention.

Figure 10:
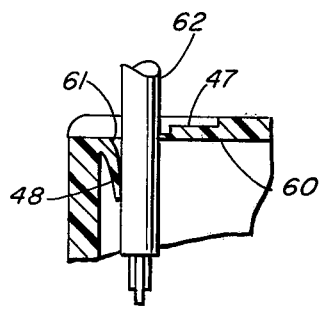

Second, the offset of the inner and outer surfaces of the flaps of the knock-out region provides two flaps of essentially equal thickness. When one flap is opened to insert a cable of small size, as shown in FIG. 10, either the forward or rearward flap can be chosen at will since either breaks away and hinges inwardly into the box with equal ease.

Third, the offset structure of the knock-out region provides for a frangible bridge to separate the flaps of the knock-out without the need for any special configuration in the mold. The frangible bridge or web separating the flaps of the knock-out region results from the orientation of the offsets of the major surfaces of the flaps. FIGS. 3, 5, 6 and 7 show various embodiments of the flap and frangible web structure.

In the preferred embodiment of the knock-out structure of electrical wiring boxes according to the present invention depicted in FIG. 3, the thin frangible web 46 is provided by extending the inner surface 55 of the forward flap 47 beyond the leading edge 57 of the outer surface 56 of the forward flap 47, and extending the outer surface 52 of the rearward flap 48 beyond the leading edge 54 of the inner surface 53 of the rearward flap 48.

Figure 5:
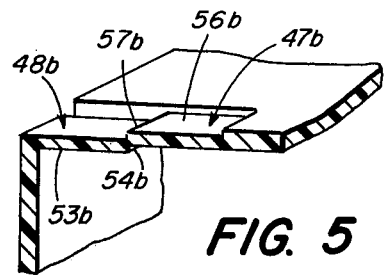

In an alternative embodiment of the knock-out structure 40, depicted in FIG. 5, the leading edge 57b of the outer surface 56b of the forward flap 47b lies essentially in the same vertical plane as the leading edge 54b of the inner surface 53b of the rearward flap 48b.

Figure 6:
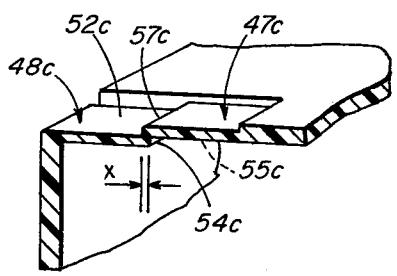
Figure 7:
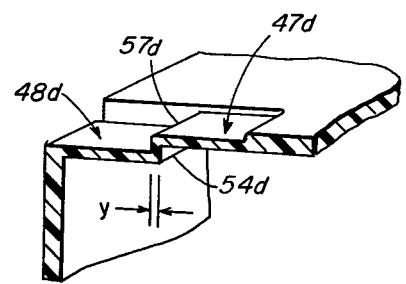

In additional alternative embodiments of the knock-out region 40, depicted in FIGS. 6 and 7, the leading edges 57c and 57d, respectively, of the forward flaps 47c and 47d extend beyond the leading edges 54c and 54d, respectively, of the rearward flaps 48c and 48d. The thin frangible web is thus provided by a region of integrally molded thin plastic lying in a plane essentially perpendicular to the planes of the surfaces of the flaps. In the embodiment shown in FIG. 6, the major inner surface 55c of the forward flap 47c lies in the same plane, or is coplanar, with the major outer surface 52c of the rearward flap 48c. In order to assure that the thin frangible web between the flaps is easily breakable, the dimension depicted as "x" in FIG. 6 or "y" in FIG. 7 should preferably be kept less than the thickness of the associated flaps.

Figure 11:
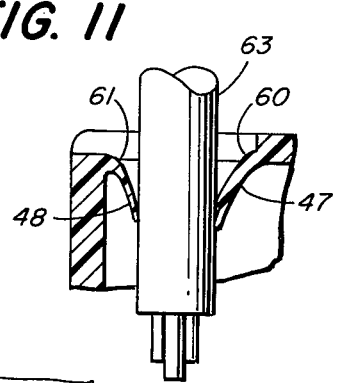
FIGS. 10–12 are fragmentary cross-sectional views showing the knock-out region of the electrical wiring box of FIG. 1 used with electrical cable of a variety of sizes.
Figure 12:
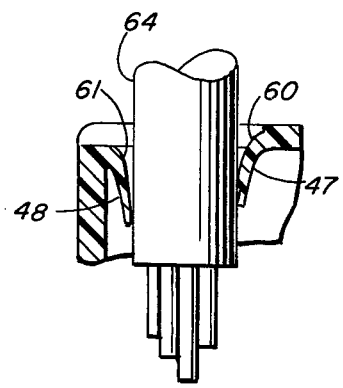

As shown in FIGS. 10–12, in order to form an aperture at a knock-out for accomodating non-metallic sheathed cable, one or both flaps 47 and 48 of the knock-out 40 are bent inward into the chamber of the box. The frangible web 46 may be broken by forcing the end of the cable against the rearward flap 48 or the forward flap 47, or, in the case of larger cables, against both flaps. Alternatively, the frangible web 46 may be broken as by placing a tool such as a screwdriver against the web and forcing inward into the chamber.

The thickness of the plastic forming the flaps 47 and 48 is such that the flaps bend at the flexible regions 60 and 61 where the ends of the flaps opposite to the frangible web join the surrounding wall structure. As the flaps 47 and 48 bend along the regions 60 and 61, the flaps break from the adjacent plastic forming the box along the weakened lines of fracture 41 and 42 and bend inwardly into the chamber of the box. The portions 60 and 61 of the flaps 47 and 48 adjoining the adjacent wall structure of the box thus form a hinge about which each flap may bend in order to form an aperture.

As depicted in most of the Figures, the flaps are of approximately the same size. Alternatively, as shown in FIG. 4, the frangible web 46a may be located closer to one end of the knock-out region such that the flaps 47a and 48a are of unequal size. In this embodiment of the invention the smaller flap, when broken, provides an aperture for cable of smaller sizes.

FIGS. 10, 11 and 12 illustrate a knock-out in accordance with the invention employed in three different ways for receiving cable of three different sizes. FIG. 10 shows the knock-out with only the rearward flap 48 displaced to provide an aperture large enough to accomodate a cable 62 of relatively small cross-sectional area, for example, number 14 two-wire plus ground or number 12 two-wire plus ground cable. As can be seen in FIG. 10, the rearward flap 48 is fully bent into the chamber and the cable 62 inserted through the resulting aperture. The region 61 of the flap 48 forming the hinge is flexible but sufficiently resilient to cause the flap 48 to bear against the cable 62 closing the opening.

FIG. 11 is a similar illustration showing a knock-out in accordance with the invention used with a larger cable 63, for example, number 10 two-wire plus ground. To accomodate the cable 63, both flaps 47 and 48 are partially open. By virtue of the resilience of the hinging regions 60 and 61, the two flaps 47 and 48 fit closely against the cable 63, essentially closing the opening.

FIG. 12 illustrates the use of the knock-out to accomodate the larger cable 64, for example number 14 three-wire plus ground, number 12 three-wire plus ground, or number 10 three-wire plus ground. The flaps 47 and 48 are forced fully open to receive the cable 64 and close against the cable to minimize the size of the remaining opening.

Thus, it can be seen that molded plastic electrical wiring boxes having knock-out structures in accordance with the present invention have an improved knock-out design which facilitates manufacture and provides an aperture for receiving non-metallic sheathed cable of different sizes while minimizing the size of the remaining opening once a cable has been inserted into the box. Access to the interior of the box is thereby limited, reducing the amount of dirt and other undesirable material which can enter. Additionally, the flow of air into or out of the box at the knock-out is minimized.

Moreover, the essentially planar and offset structure of flaps of knock-out regions of wiring boxes according to the present invention provide for an overall box structure which has greater mold release facility. Additionally, since the flaps are of essentially equal thickness, either flap may break away from the surrounding wall structure and hinge with equal ease.

While there has been shown and described what are considered to be the preferred embodiments of the present invention, it will be obvious to those skilled in the art that various changes and modifications may be made therein without departing from the invention as defined by the appended claims.

What is claimed is:

1. A molded plastic electrical wiring box for use with non-metallic sheathed cable comprising:
    a wall structure defining front-to-rear walls and a back wall therebetween which in combination define a chamber within the box;
    said wall structure having integrally molded thereinto a generally rectangular knock-out region having two opposite side edges, two opposite ends;
    two substantially parallel lines of fracture delineating the opposite side edges of said knock-out region;
    a resilient hinging means connecting each of the opposite ends of said knock-out region to said wall structure;
    a frangible bridge extending across the knock-out region in a line from one of said lines of fracture to the other, dividing said knock-out region into two flaps, each having an inner and an outer major surface;
    the major surfaces of said flaps being substantially planar, the plane of each major surface of one flap being spaced from the plane of the corresponding major surface of the second flap, to provide said frangible bridge, and a resilient hinging means joining the end of each flap opposite said frangible web to the surrounding wall structure;
    whereby an aperture for accommodating non-metallic sheathed cable may be formed in said knock-out region by breaking said frangible bridge and separating one or both of said flaps from said knock-out region along the lines of fracture, and by bending one or both flaps about the resilient hinging means.

2. A molded plastic electrical wiring box according to claim 1 wherein the molded plastic of said knock-out region is thinner than the molded plastic of said wall structure.

3. A molded plastic electrical wiring box according to claim 2 wherein said flaps are of substantially the same thickness.

4. A molded plastic electrical wiring box according to claim 3 wherein said frangible bridge comprises a region of molded plastic thinner than the molded plastic of said flaps.

5. A molded plastic electrical wiring box according to claim 4 wherein said frangible bridge has one surface substantially in the plane of the inner major surface of one of said flaps and the other surface of said frangible bridge substantially in the plane of the outer major surface of the other of said flaps.

6. A molded plastic electrical wiring box according to claim 2 wherein said frangible bridge is closer to one end of said knock-out than the other whereby said flaps are of unequal size.

7. A molded plastic electrical wiring box according to claim 2 wherein said knockout region is located in said front-to-rear wall structure adjacent to said back wall.

* * * * *